(12) United States Patent
Wessling et al.

(10) Patent No.: US 8,788,208 B2
(45) Date of Patent: Jul. 22, 2014

(54) METHOD TO ESTIMATE PORE PRESSURE UNCERTAINTY FROM TRENDLINE VARIATIONS

(75) Inventors: Stefan Wessling, Lower Saxony (DE); Jianyong Pei, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 417 days.

(21) Appl. No.: 13/229,212

(22) Filed: Sep. 9, 2011

(65) Prior Publication Data

US 2013/0066558 A1 Mar. 14, 2013

(51) Int. Cl.
*G01V 1/40* (2006.01)
(52) U.S. Cl.
CPC ........................................ *G01V 1/40* (2013.01)
USPC .................................................. 702/7; 702/11
(58) Field of Classification Search
CPC .................................... E21B 7/68; G01V 1/40
USPC .............................................................. 702/7
See application file for complete search history.

(56) References Cited

U.S. PATENT DOCUMENTS

| | | | |
|---|---|---|---|
| 5,128,866 | A | 7/1992 | Weakley |
| 6,808,028 | B2 | 10/2004 | Woodburn et al. |
| 6,826,486 | B1 | 11/2004 | Malinverno |
| 6,954,066 | B2 | 10/2005 | Siess et al. |
| 7,349,807 | B2 | 3/2008 | Moos et al. |
| 2007/0118292 | A1 | 5/2007 | Moos |
| 2012/0046865 | A1* | 2/2012 | Heisig et al. ...................... 702/6 |

OTHER PUBLICATIONS

Notification of Transmittal of the International Search Report and the Written Opinion of the International Searching Authority, or the Declaration; PCT/US2012/053644; Jan. 24, 2013.
Al-Ajmi et al. "Probabilistic wellbore collapse analysis." Journal of Petroleum Science and Engineering, vol. 74, Issues 3-4, Sep. 8, 2010, pp. 171-177.
Doyen et al. "Seismic pore pressure prediction with uncertainty using a probabilistic mechanical earth model." 2004 CSEG National Convention. pp. 1-4.
Kao, Jeff C. et al., Estimating Pore Pressure Using Compressional and Shear Wave Data from Multicomponent Seismic Nodes in Atlantis Field, Deepwater Gulf of Mexico, Journal Article, Jan. 2010, 1641-1645, vol. 29, SEG.
Matthews, Martin D. "Uncertainty—Shale Pore Pressure from Borehole Resistivity." Sixth North America Rock Mechanics Symposium, Jun. 5-9, 2004. ARMA/NARMS 04-551. pp. 1-8.

* cited by examiner

*Primary Examiner* — Bryan Bui
(74) *Attorney, Agent, or Firm* — Cantor Colburn LLP

(57) ABSTRACT

Disclosed is a method for estimating a pore pressure of an earth formation penetrated by a borehole and an associated uncertainty. The method includes: conveying a carrier through the borehole; performing formation measurements relating to porosity at a plurality of depths in the borehole using a downhole tool coupled to the carrier; defining a first depth interval and a second depth interval deeper than the first depth interval, the first depth interval comprising a first set of formation measurement points and the second depth interval comprising a second set of formation measurement points; establishing a plurality of trendlines of depth versus porosity-related measurements using a processor with each trendline in the plurality of trendlines extending from a point in the first depth interval through a point in the second depth interval; and calculating a pore pressure line and associated uncertainty using the plurality of trendlines.

21 Claims, 4 Drawing Sheets

US 8,788,208 B2

METHOD TO ESTIMATE PORE PRESSURE UNCERTAINTY FROM TRENDLINE VARIATIONS

BACKGROUND

Geologic formations are used for many purposes such as hydrocarbon production, geothermal production and carbon dioxide sequestration. Boreholes are typically drilled into the earth in order to access the formations. Prior to a borehole being drilled, forces or loads in the rock mass of a formation are in equilibrium with each other to keep the rock mass in static equilibrium. When the borehole is drilled, the loads must be evenly distributed to adjacent rock and materials in order to keep the formation in static equilibrium. Keeping the drilled formation stable generally requires a support pressure be applied by drilling mud in the borehole. The proper support pressure is related to the pressure of the formation fluid in the pores of the formation (i.e., pore pressure). If the applied support pressure is insufficient, the formation surrounding the borehole may become unstable and collapse into the borehole damaging equipment and causing costly delays.

During drilling, the pressure of the drilling mud is maintained within a pressure window by a mud program. It is important that the pressure window be accurately determined in order to efficiently drill the borehole and prevent damage. Hence, it would be well received in the drilling industry if estimates of pore pressure were provided with an uncertainty that could be used as input to the mud program in order for the pressure window to compensate for the uncertainty.

BRIEF SUMMARY

Disclosed is a method for estimating a pore pressure of an earth formation penetrated by a borehole and an associated uncertainty. The method includes: conveying a carrier through the borehole; performing formation measurements relating to porosity at a plurality of depths in the borehole using a downhole tool coupled to the carrier; defining a first depth interval and a second depth interval deeper than the first depth interval, the first depth interval comprising a first set of formation measurement points And the second depth interval comprising a second set of formation measurement points; establishing a plurality of trendlines of depth versus porosity-related measurements using a processor with each trendline in the plurality of trendlines extending from a point in the first depth interval through a point in the second depth interval; and calculating a pore pressure line and associated uncertainty using the plurality of trendlines.

Also disclose is an apparatus for estimating a pore pressure of an earth formation penetrated by a borehole and an associated uncertainty. The apparatus includes: a carrier configured to be conveyed through the borehole; a downhole tool coupled to the carrier and configured to perform formation measurements related to porosity at a plurality of depths in the borehole; and a processor coupled to the downhole tool and configured to implement a method. The method includes: receiving formation measurements from the downhole tool at a plurality of depths in the borehole; defining a first depth interval and a second depth interval deeper than the first depth interval, the first depth interval comprising a first set of formation measurement points and the second depth interval comprising a second set of formation measurement points; establishing a plurality of trendlines of depth versus porosity-related measurements with each trendline in the plurality of trendlines extending from a point in the first depth interval through a point in the second depth interval; and calculating a pore pressure line and associated uncertainty using the plurality of trendlines.

Further disclosed is A non-transitory computer-readable medium having computer-executable instructions for estimating a pore pressure of an earth formation penetrated by a borehole and an associated uncertainty by implementing a method that includes: receiving formation measurements from a downhole tool configured to perform formation measurements related to porosity at a plurality of depths in the borehole; defining a first depth interval and a second depth interval deeper than the first depth interval, the first depth interval comprising a first set of formation measurement points and the second depth interval comprising a second set of formation measurement points; establishing a plurality of trendlines of depth versus porosity-related measurements using a processor with each trendline in the plurality of trendlines extending from a point in the first depth interval through a point in the second depth interval; calculating a pore pressure line and associated uncertainty using the plurality of trendlines.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the Figures.

Figure 1:
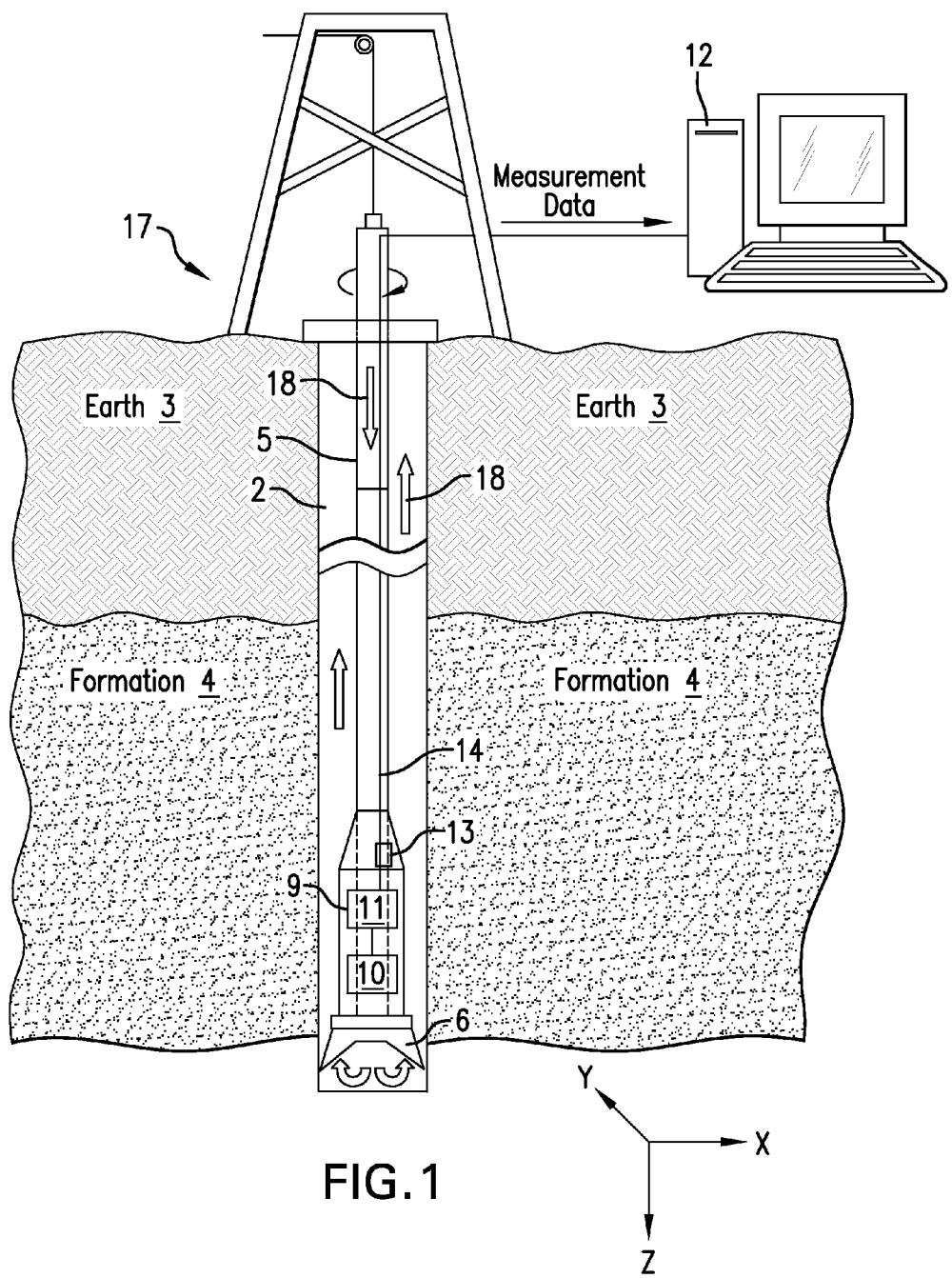
FIG. 1 illustrates an exemplary embodiment of a downhole porosity tool disposed in a borehole penetrating the earth.

FIG. 1 illustrates an exemplary embodiment of a bottom hole assembly (BHA) 9 disposed in a borehole 2 penetrating the earth 3, which includes an earth formation 4. The BHA 9 is conveyed through the borehole 2 by a drill string 5 for logging-while-drilling applications. A drill bit 6 is disposed at the distal end of the drill string 5 for drilling the borehole 2. A drill rig 17 rotates the drill string 5 to drill the borehole 2 and pumps drilling fluid 18 through the drill string 5 in order to lubricate the drill bit 6 and flush cuttings from the borehole 2. A downhole tool 10 is disposed in the BHA 9 and configured to perform measurements of the formation 4 at various depths to produce a measurement log. In one or more embodiments, the downhole formation measurements are related to the porosity of the formation 4. That is the porosity of the formation 4 can be deduced from those measurements. Non-limiting embodiments of those formation measurements include resistivity measurements, acoustic measurements, and density measurements using a radiation source. In addition, in one or more embodiments, the downhole tool 10 or another downhole tool 10 may be configured to discriminate or identify the presence of shale in the formation 4 by natural gamma-ray logging in order to apply the methods disclosed herein.

Still referring to FIG. 1, a downhole electronic unit 11 is disposed in the BHA 9. The downhole electronic unit 11 is configured to operate the downhole tool 10 and/or process measurement data. In one or more embodiments, raw or processed measurement data can be transmitted to a computer processing system 12 disposed at the surface of the earth 3 via a telemetry system 13. The telemetry system 13 can be wired drill pipe 14 for real time communications or pulsed-mud as non-limiting examples. Data processing functions can be performed by the downhole electronic unit 11, the computer processing system 12 or some combination of both.

The downhole electronic unit 11 and/or the computer processing system 12 includes a processor for executing an algorithm that implements a method for estimating the pore pressure of the formation 4 as a function of depth and an associated uncertainty. The pore pressure and uncertainty are then provided to update a mud program for maintaining the drilling fluid pressure within the pressure window.

Before the pore pressure uncertainty method is discussed in detail, certain terms related to sedimentary compaction are presented. Pore pressure in the underground can be hydrostatic, over pressure, or under pressure, and different mechanisms exist that can cause a deviation of the pore pressure from hydrostatic. One such mechanism is based on the compaction of sedimentary material, which is transported into sedimentary basins. Compaction is referred to as the settlement of fine or coarse sedimentary material and continuous burial of the settled material with increasing addition of further sedimentary material. Under normal conditions, fluid existing in the pore space in the sedimentary material will be squeezed out of the material, so that the porosity of the sediment will decrease with increasing load from above sediments. This mechanism of normal compaction results in a hydrostatic pore pressure distribution. Assuming that compaction is the only pore pressure generating mechanism, overpressure is generated whenever the fluid within the pore space is trapped with continuous burial of the sediment. During the drilling operation, the compaction trend of sediments can be monitored by inspection of porosity-indicating logs or drilling curves. Logs can be the resistivity or acoustic slowness of the formation, the bulk density or others. A drilling curve example is the corrected drilling exponent DXC. Using the resistivity log as an example, an overpressure zone is indicated by a decrease in resistivity from what would be expected in a normal compaction zone (i.e., a trend of an increase in resistivity with increasing depth as pore size decreases). In one or more embodiments, the disclosed techniques for estimating pore pressure and associated uncertainty are applied only to shale in shale containing formations. Hence, in these embodiments, the porosity-related formation measurements are filtered to exclude measurements performed on non-shale portions of the formation.

Figure 2:
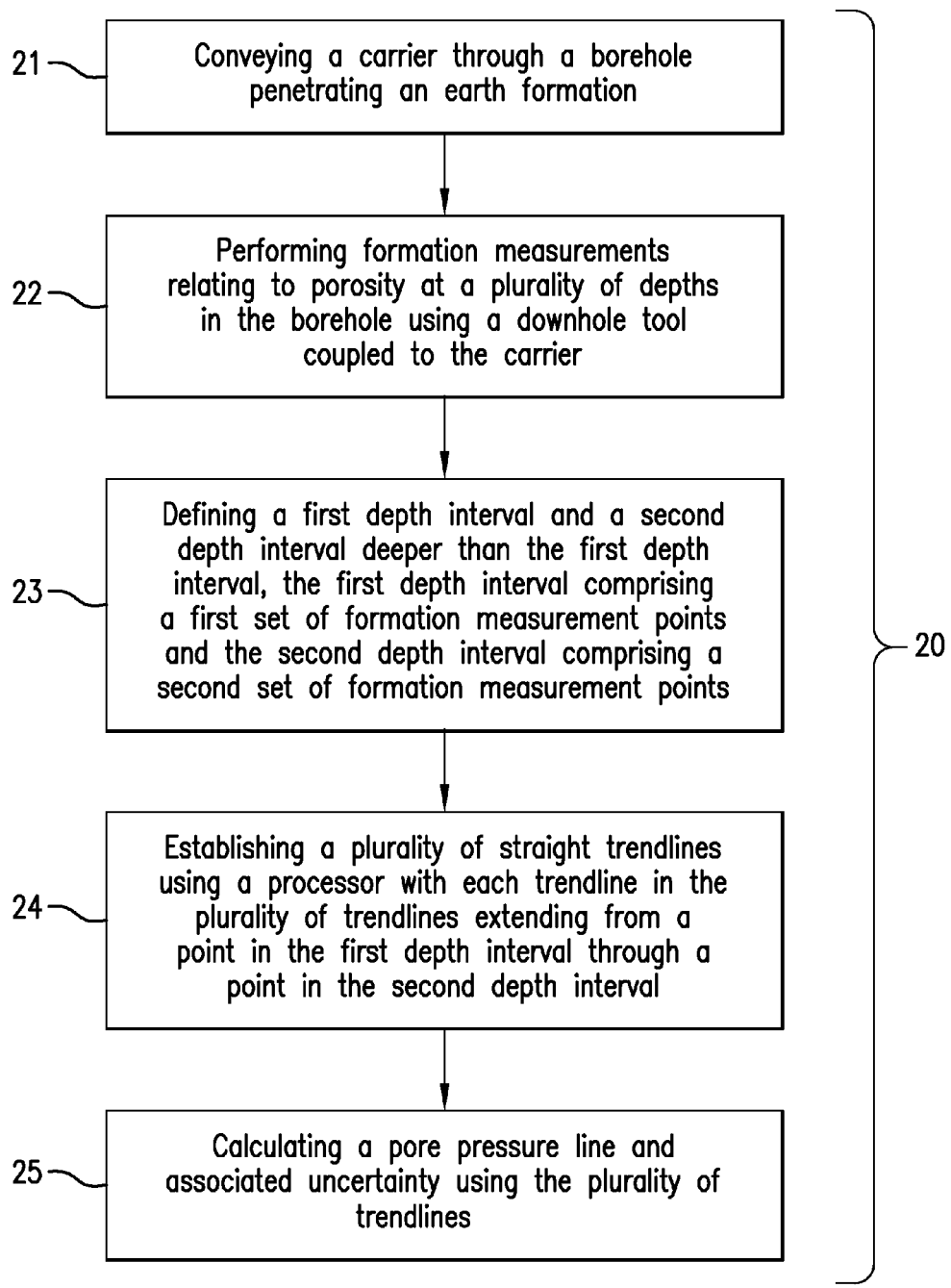
FIG. 2 presents a flow chart depicting aspects of a method for estimating formation pore pressure and an associated uncertainty.

Reference may now be had to FIG. 2 which presents a flow chart depicting aspects of a method 20 for determining pore pressure and pore pressure uncertainty as a function of depth. Step 21 in method 20 calls for conveying a carrier coupled to the downhole tool 10 through a borehole. Step 22 calls for performing formation measurements using the downhole tool 10 to obtain a log of formation measurements related to porosity of the formation.

Step 23 calls for defining a first or upper depth interval and a second or lower depth interval that is deeper in the borehole than the upper depth interval. Each depth interval includes a plurality of formation measurements made within those intervals. Step 24 calls for establishing a plurality of compaction trendlines extending from the upper depth interval to the lower depth interval and beyond. Each trendline is defined by a unique set of measurement points with one measurement point being in the upper depth interval and one measurement point being in the lower depth interval. Each trendline may be parameterized by a slope and an intercept of a Y-depth axis as shown in Track 1 in FIG. 3.

Figure 4:
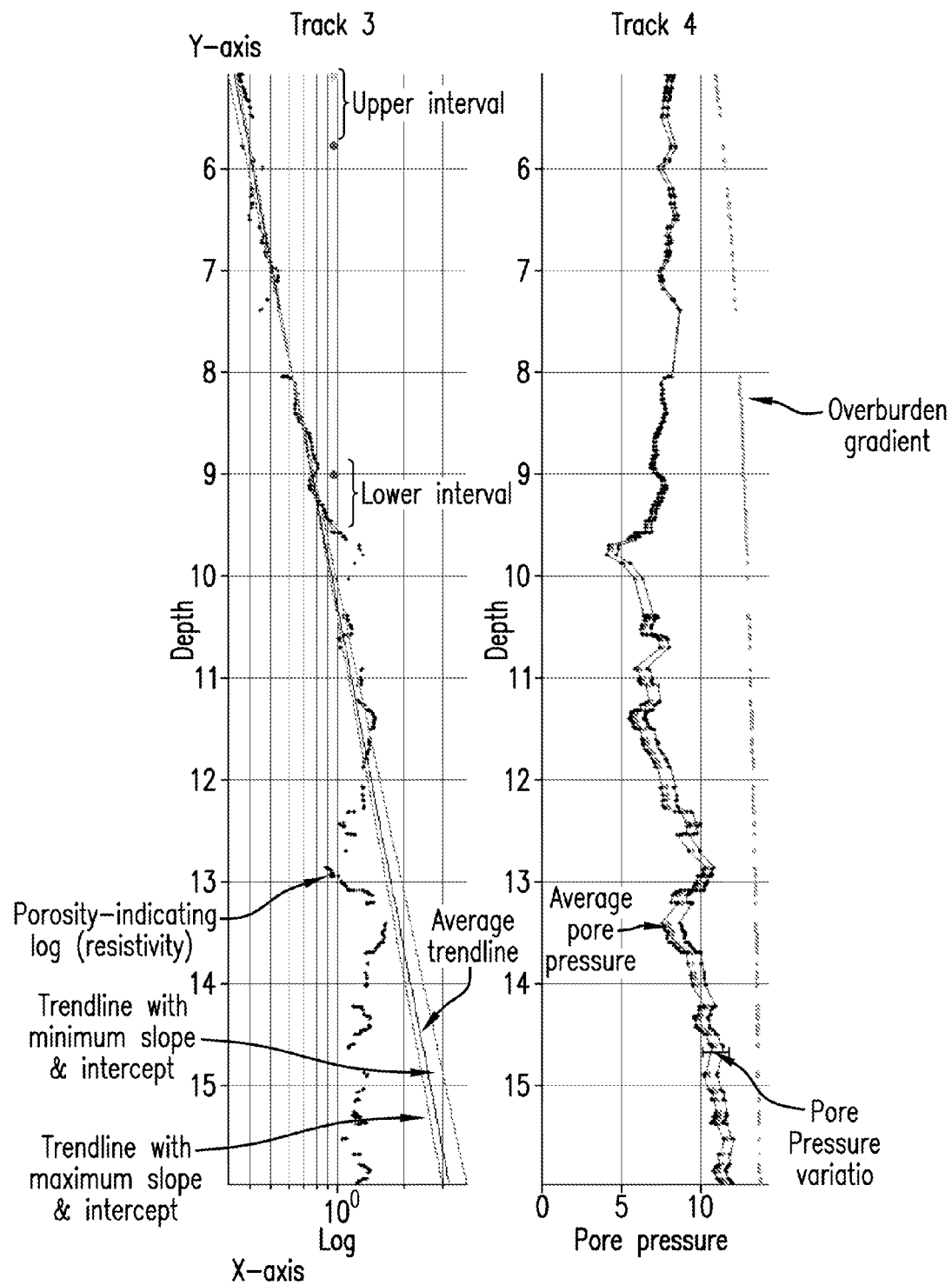
FIG. 4 depicts aspects of another approach for estimating formation pore pressure and an associated uncertainty.

Various ways may be employed to establish the plurality of trendlines. One way is to determine the set of points (i.e., one point in the upper depth interval and one point in the lower depth interval) that establishes a first trendline having a minimum slope and minimum intercept and the set of points that establishes a second trendline having a maximum slope and maximum intercept from all sets of points in the upper and lower depth intervals as shown in Track 3 in FIG. 4. Alternatively, the first trendline may be established having a minimum slope and maximum intercept and the second trendline may be established having a maximum slope and minimum intercept. In general, the combination providing the widest spread in values may be selected to provide the basis for calculating a representative trendline (e.g., representing the most likely trendline) and associated uncertainty.

Figure 3:
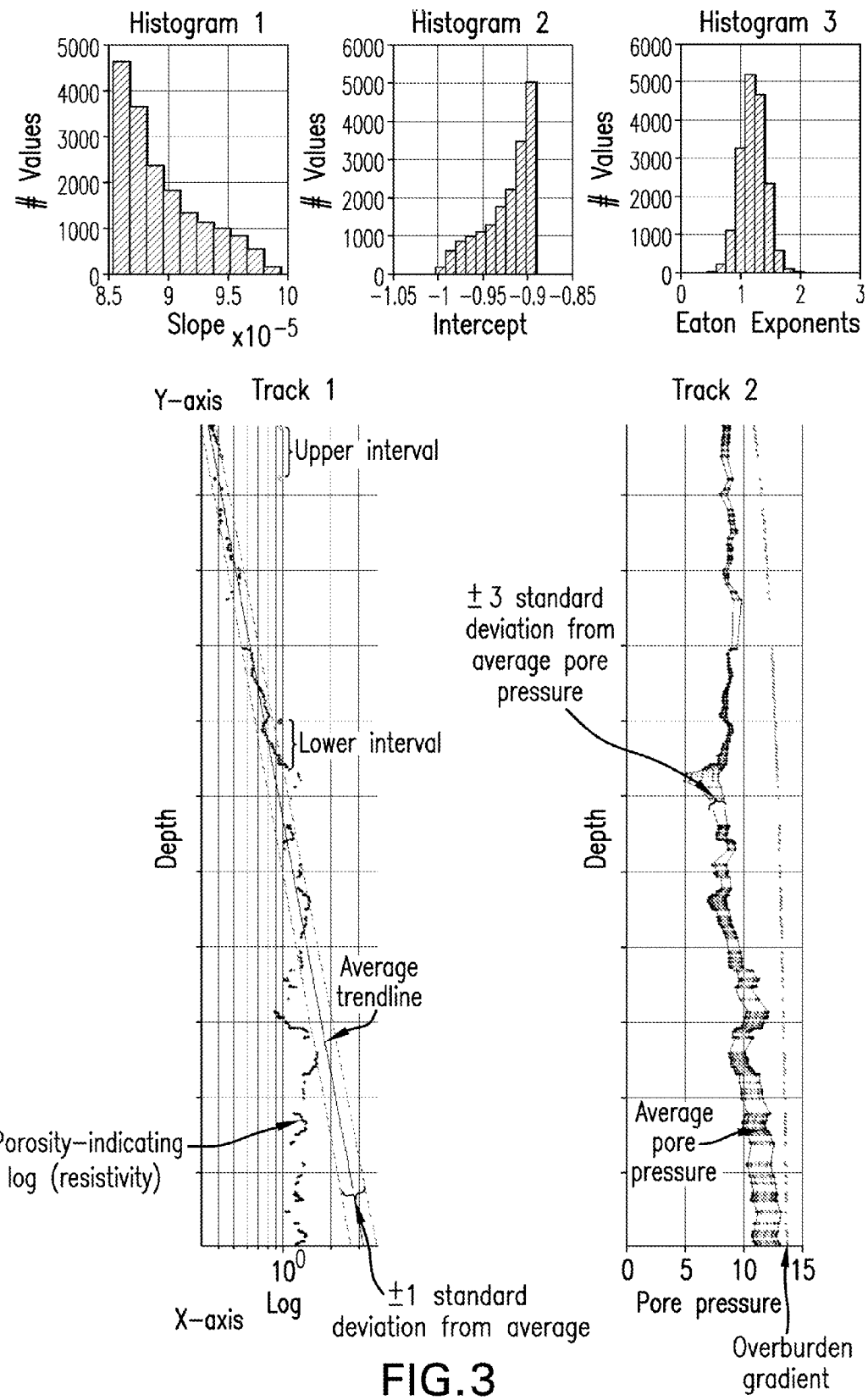
FIG. 3 depicts aspects of one approach for estimating formation pore pressure and an associated uncertainty.

Another way of establishing the plurality of trendlines involves generating trendlines through every combination or set of measurement points in the upper and lower depth intervals. Histograms 1 and 2 in FIG. 3 illustrate the spread in slope values and intercept values, respectively. Because every trendline in the plurality of trendlines cannot be shown, FIG. 3 in Track 1 illustrates an average trendline calculated from the plurality of trendlines and the standard deviation from the average trendline. The representative trendline illustrated in Track 1 in FIG. 3 is the average trendline.

Step 25 in method 20 calls for calculating a pore pressure line (i.e., most likely estimate of pore pressure as a function of depth) and associated uncertainty using the plurality of trendlines. Various methods are known in the art for converting porosity to pore pressure. One method is referred to as Eaton's method. Eaton's method can be used with resistivity logs, conductivity logs, acoustic velocity logs, acoustic slowness logs, or drilling exponent data. Equations (1)-(5) list various forms of equations in Eaton's method for calculating pore pressure (PP) depending on the type of log used to measure porosity. Eaton's method uses the overburden gradient as an input to the method. The overburden gradient is determined using established techniques and is shown in Track 2 in FIG. 3 and Track 4 in FIG. 4.

$$PP = OBG - (OBG - PP_N)\left(\frac{R_0}{R_N}\right)^x \quad (1)$$

$$PP = OBG - (OBG - PP_N)\left(\frac{V_0}{V_N}\right)^x \quad (2)$$

$$PP = OBG - (OBG - PP_N)\left(\frac{DT_N}{DT_0}\right)^x \quad (3)$$

$$PP = OBG - (OBG - PP_N)\left(\frac{C_N}{C_O}\right)^x \quad (4)$$

$$PP = OBG - (OBG - PP_N)\left(\frac{DXC_0}{DXC_N}\right)^x \quad (5)$$

In the above equations:
Default value of Eaton exponent x in equation (1) is 1.2;
Default value of Eaton exponent x in equations (2) and (3) is 3;
OBG=overburden gradient (ppg, kPa/m, or g/cm$^3$);
PP$_N$=normal pore pressure gradient (ppg, kPa/m, or g/cm$^3$);
R$_0$=observed resistivity (overpressured interval, Ωm);

$R_N$="normal" (expected) resistivity (Ωm);
$V_O$=observed interval velocity (overpressured interval; m/s or ft/s);
$V_N$="normal" (expected) interval velocity (m/s or ft/s);
$DT_O$=observed transit time (overpressured interval; μs/ft);
$DT_N$="normal" (expected) transit time (μs/ft);
$C_O$=observed conductivity (overpressured interval; S/m);
$C_N$="normal" (expected) conductivity (S/m);
$DXC_O$=observed DXC (overpressured interval); and
$DXC_N$="normal" (expected) DXC.

As with establishing the plurality of trendlines, there are a number of ways to determine the pore pressure line, which represents pore pressure as a function of depth, and an associated uncertainty. In one way illustrated in Tracks 3 and 4 in FIG. 4, a representative trendline is calculated from the first trendline having the minimum slope and the second trendline having a maximum slope. The representative trendline can be an average of the two trendlines in one embodiment. It can be appreciated that other mathematical techniques can be used to determine the representative trendline such as calculating a mean trendline. The uncertainty associated with the average trendline is the spread between the first trendline and the second trendline.

Once the representative trendline is calculated, Eaton's method can be applied to determine the pore pressure line (i.e., the representative pore pressure line). Similarly, Eaton's method can be applied to the first trendline and the second trendline to determine the spread of values or uncertainty about the pore pressure line.

When the plurality of trendlines involves generating trendlines through every combination of measurement points in the upper and lower depth intervals, two approaches may be used to determine the pore pressure line and associated uncertainty. In the first approach, Eaton's method using constant parameters is applied to each trendline in the plurality of trendlines to generate a plurality of corresponding pore pressure lines. The representative pore pressure line, such as an average pore pressure line for example, is then calculated from the plurality of pore pressure lines. A statistical method is then applied to the plurality of pore pressure lines to calculate the standard deviation of the plurality of pore pressure lines. The standard deviation is one example of the uncertainty associated with the representative or calculated pore pressure line.

In the second approach, Eaton's method using a random varying parameter such as Eaton's exponent is applied to each trendline in the plurality of trendlines to generate a plurality of corresponding pore pressure lines. As in the first approach, the pore pressure line can be calculated as an average of the plurality of corresponding pore pressure lines. Similarly, a statistical method is then applied to the plurality of pore pressure lines to calculate the standard deviation of the plurality of pore pressure lines where the standard deviation represents the uncertainty. This approach is illustrated in Tracks 1 and 2 in FIG. 3 with Histogram 3 illustrating the distribution of the Eaton exponents.

It can be appreciated that certain mathematical techniques other than calculating an average may be used to determine the calculated pore pressure line. In one or more embodiments, a mean value may be calculated. It can also be appreciated that certain statistical techniques other than calculating the standard deviation may be used to calculate the uncertainty associated with the calculated pore pressure line.

It can be appreciated that as the borehole 2 is drilled into the earth 3 in a real time LWD application the second depth interval can be continuously shifted deeper into the earth 3 or widened so that the lower part of the interval extends deeper into the borehole 2. In addition, the first depth interval may also be shifted or widened deeper into the borehole 2. As the depth intervals are shifted or widened, these new intervals are continuously populated with formation measurements performed within these intervals. In one or more embodiments, the second depth interval maintains a constant length and is continuously shifted to be at the deepest point of the drilling run up to where the normal compaction trend ends. In one or more embodiments, the depth intervals are changed with drilling such as to maintain a predefined ratio of the lengths of the depth intervals to the total drilling depth (e.g., the lengths of the depth intervals are maintained at 0.1 times the total drilling depth). In one or more embodiments, the upper depth interval and the upper point of the lower depth interval remain fixed while the lower point of the lower depth interval is continuously moved deeper in the borehole. It can be appreciated that there are many approaches to shift or widen the depth intervals either continuously as the borehole is being drill or at certain time or drilling distance intervals and that these additional approaches are inherently include in this disclosure.

It can be appreciated that as the depth intervals are shifted or widened, the steps of the method 20 are iterated to provide a latest estimate of the pore pressure line and the associated uncertainty.

It can be appreciated that the method 20 can be performed using more than one porosity log and that a combined statistical analysis can be performed on all pluralities of trendlines established from each log. In addition, the pore pressure line (e.g., the average pore pressure line) and its associated uncertainty can be calculated from these pluralities of trendlines.

It can be appreciated that trendlines can be established by linear regression of all measurement points in the upper and lower depth intervals in lieu of a selection of only one measurement point in each interval to establish a trendline. As the depth intervals are shifted or widened and more formation measurement points are obtained, a plurality of trendlines are established and used to determine the pore pressure line and the associated uncertainty.

It can be appreciated that the porosity-indicating logs for the use in the method 20 can be obtained from boreholes different from the borehole being drilled (e.g., offset boreholes or wells). In real time LWD applications, the analysis of trendlines can be performed on porosity-indicating logs from offset wells in combination with porosity-indicating logs from the target borehole being drilled. If the porosity-indicating logs originate from different locations, a weighting function may be applied to the derived trendlines in order to represent the transferability of characteristics between the locations of the boreholes wherein the logs were acquired.

In one or more embodiments, the method 20 can include a step for identifying the presence of shale such as with a gamma-ray log for example and for filtering out those porosity-related measurements performed on non-shale portions of the formation.

In support of the teachings herein, various analysis components may be used, including a digital and/or an analog system. For example, the downhole electronic unit 11, the surface computer processing 12, or the downhole tool 10 may include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottomhole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order. The term "couple" relates to coupling a first component to a second component either directly or indirectly through an intermediate component.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for estimating a pore pressure of an earth formation penetrated by a borehole and an associated uncertainty, the method comprising:

conveying a carrier through the borehole;
performing formation measurements relating to porosity at a plurality of depths in the borehole using a downhole tool coupled to the carrier;
defining a first depth interval and a second depth interval deeper than the first depth interval, the first depth interval comprising a first set of formation measurement points and the second depth interval comprising a second set of formation measurement points;
establishing a plurality of trendlines of depth versus porosity-related measurements using a processor with each trendline in the plurality of trendlines extending from a point in the first depth interval through a point in the second depth interval; and
calculating a pore pressure line and associated uncertainty using the plurality of trendlines.

2. The method according to claim 1, wherein calculating comprises calculating a representative trendline.

3. The method according to claim 2, wherein the representative trendline is an average of the plurality of trendlines.

4. The method according to claim 2, wherein the plurality of trendlines comprises a first trendline defined by a measurement point in the first depth interval and a measurement point in the second depth interval that provide a minimum of all slopes of trendlines resulting from all combinations of measurement points in the first and second depth intervals.

5. The method according to claim 4, wherein the first trendline has a minimum intercept of a Y-depth axis compared to all trendlines resulting from all combinations of measurement points in the first and second intervals second depth interval.

6. The method according to claim 4, wherein the plurality of trendlines comprises a second trendline defined by a measurement point in the first depth interval and a measurement point in the second depth interval that provide a maximum of all slopes of trendlines resulting from all combinations of measurement points in the first and second depth intervals.

7. The method according to claim 6, wherein the second trendline has a maximum intercept of the Y-depth axis compared to all trendlines resulting from all combinations of measurement points in the first and second intervals second depth interval.

8. The method according to claim 6, wherein the pore pressure line is calculated from converting the representative trendline to pore pressure as a function of depth using a mathematical relation relating formation measurements to pore pressure.

9. The method according to claim 8, wherein the first trendline is converted to a first pore pressure line and the second trendline is converted to a second pore pressure line using the mathematical relation and the uncertainty at a selected depth is the width between the first and second pore pressure lines at the selected depth.

10. The method according to claim 1, wherein the plurality of trendlines comprises a trendline for every combination of a first measurement point in the first depth interval and a second measurement point in the second depth interval.

11. The method according to claim 10, wherein calculating comprises converting the plurality of trendlines to a plurality of corresponding pore pressure lines using a mathematical relation relating formation measurements to pore pressure and determining a standard deviation of the plurality of corresponding pore pressure lines from the calculated pore pressure line.

12. The method according to claim 10, further comprising randomly varying an exponent of a mathematical relation relating formation measurements to pore pressure for converting the plurality of trendlines to a plurality of corresponding pore pressure lines and determining a standard deviation of the plurality of corresponding pore pressure lines from the calculated pore pressure line.

13. The method according to claim 1, further comprising shifting the second depth interval deeper into the borehole and iterating the steps of claim 1 until the second interval reaches an end of a normal compaction zone.

14. The method according to claim 13, further comprising shifting the first depth interval deeper into the borehole.

15. The method according to claim 14, wherein a distance between the first depth interval and the second depth interval remains constant.

16. The method according to claim 14, wherein a distance between the first depth interval and the second depth interval is a proportion of a total distance of a drill string drilling the borehole.

17. The method according to claim 1, further comprising moving a deepest end point of the second depth interval to be at a depth where formation measurements are being performed by the downhole tool and iterating the steps of claim 1 until the second interval reaches an end of a normal compaction zone.

18. The method according to claim 1, wherein each trendline in the plurality of trendlines is linear with the porosity-related measurements being plotted along a logarithmic scale.

19. An apparatus for estimating a pore pressure of an earth formation penetrated by a borehole and an associated uncertainty, the apparatus comprising:
a carrier configured to be conveyed through the borehole;
a downhole tool coupled to the carrier and configured to perform formation measurements related to porosity at a plurality of depths in the borehole; and
a processor coupled to the downhole tool and configured to implement a method comprising:
receiving formation measurements from the downhole tool at a plurality of depths in the borehole;
defining a first depth interval and a second depth interval deeper than the first depth interval, the first depth interval comprising a first set of formation measurement points and the second depth interval comprising a second set of formation measurement points;
establishing a plurality of trendlines of depth versus porosity-related measurements with each trendline in the plurality of trendlines extending from a point in the first depth interval through a point in the second depth interval; and
calculating a pore pressure line and associated uncertainty using the plurality of trendlines.

20. The apparatus according to claim 19, wherein the downhole tool comprises at least one of a resistivity tool, a density tool, and an acoustic tool.

21. A non-transitory computer-readable medium comprising computer-executable instructions for estimating a pore pressure of an earth formation penetrated by a borehole and an associated uncertainty by implementing a method comprising:
receiving formation measurements from a downhole tool configured to perform formation measurements related to porosity at a plurality of depths in the borehole;
defining a first depth interval and a second depth interval deeper than the first depth interval, the first depth interval comprising a first set of formation measurement points and the second depth interval comprising a second set of formation measurement points;
establishing a plurality of trendlines of depth versus porosity-related measurements using a processor with each trendline in the plurality of trendlines extending from a point in the first depth interval through a point in the second depth interval;
calculating a pore pressure line and associated uncertainty using the plurality of trendlines.

* * * * *